United States Patent
Nishiyama et al.

(10) Patent No.: US 6,704,172 B2
(45) Date of Patent: Mar. 9, 2004

(54) THIN FILM MAGNETIC HEAD USING AL-SI-O INSULATING MATERIAL AND METHOD OF MANUFACTURING THE SAME

(75) Inventors: Yoshihiro Nishiyama, Niigata-ken (JP); Yasuo Hayakawa, Niigata-ken (JP)

(73) Assignee: Alps Electric Co., Ltd., Tokyo (JP)

( * ) Notice: Subject to any disclaimer, the term of this patent is extended or adjusted under 35 U.S.C. 154(b) by 221 days.

(21) Appl. No.: 09/862,191

(22) Filed: May 21, 2001

(65) Prior Publication Data

US 2001/0046109 A1 Nov. 29, 2001

(30) Foreign Application Priority Data

May 26, 2000 (JP) ........................... 2000-155784

(51) Int. Cl.$^7$ ................................. G11B 5/39
(52) U.S. Cl. ........................................ 360/320
(58) Field of Search ................... 360/320, 317, 360/126, 313, 324, 324.1

(56) References Cited

U.S. PATENT DOCUMENTS

| | | | |
|---|---|---|---|
| 5,687,045 A | | 11/1997 | Okai et al. |
| 6,219,206 B1 | * | 4/2001 | Odai et al. ............ 360/320 |
| 6,252,749 B1 | * | 6/2001 | Hayakawa ............. 360/320 |
| 6,459,551 B1 | * | 10/2002 | Hayakawa ............. 360/313 |

FOREIGN PATENT DOCUMENTS

| | | | |
|---|---|---|---|
| JP | 5-217118 | * | 8/1993 |
| JP | 8-77514 | | 3/1996 |

* cited by examiner

*Primary Examiner*—David O. Ometz
(74) *Attorney, Agent, or Firm*—Brinks Hofer Gilson & Lione

(57) ABSTRACT

A thin film magnetic head includes a lower gap layer and/or an upper gap layer made of an AlSiO film having a Si content of 2 at % to 9 at % of the total or an AlSiON film further having a N content of 2 at % to 10 at %. Therefore, the insulation performance, developer resistance, smoothness and heat radiation property of the gap layer can be improved as compared with a gap layer made of $Al_2O_3$.

5 Claims, 9 Drawing Sheets

$Al_{37.0}Si_{2.5}O_{60.5}$ $Al_{34.0}Si_{5.0}O_{61.0}$ $Al_{31.0}Si_{7.5}O_{61.5}$ $Al_{28.0}Si_{10.0}O_{62.0}$

① $Al_{34.0}Si_{5.0}O_{61.0}$
② $Al_{33.5}Si_{5.0}O_{59.5}N_{2.0}$
③ $Al_{34.0}Si_{5.0}O_{56.0}N_{5.0}$
④ $Al_{33.0}Si_{4.8}O_{52.2}N_{10.0}$ $Al_{34.0}Si_{5.0}O_{61.0}$
$Al_{33.5}Si_{5.0}O_{59.5}N_{2.0}$
$Al_{34.0}Si_{5.0}O_{56.0}N_{5.0}$
④ $Al_{33.0}Si_{4.8}O_{52.2}N_{10.0}$

◆ ① $Al_{34.0}Si_{5.0}O_{61.0}$
■ ② $Al_{33.5}Si_{5.0}O_{59.5}N_{2.0}$
○ ③ $Al_{33.0}Si_{4.8}O_{52.2}N_{10.0}$

THIN FILM MAGNETIC HEAD USING AL-SI-O INSULATING MATERIAL AND METHOD OF MANUFACTURING THE SAME

BACKGROUND OF THE INVENTION

1. Field of the Invention

The present invention relates to a thin film magnetic head comprising a magnetoresistive element using the magnetoresistive effect of a spin-valve film or the like, and particularly to a thin film magnetic head comprising gap layers which are formed above and below a magnetoresistive element and which have improved characteristics, and a method of manufacturing the thin film magnetic head.

2. Description of the Related Art

FIG. 18 is a partial sectional view of a conventional thin film magnetic head, as viewed from the side facing a recording medium. The thin film magnetic head shown in FIG. 18 is a reproducing head (MR head) which is laminated on the trailing side end surface of a slider made of a ceramic material.

In FIG. 18, reference numeral 1 denotes a lower shield layer formed at the lowermost side and comprises a magnetic material such as sendust, permalloy (Ni—Fe system alloy), or the like.

A lower gap layer 3 is formed on the lower shield layer 1, and a magnetoresistive element 4 is further formed on the lower gap layer 3. The magnetoresistive element 4 comprises a GMR element, an AMR element, or the like comprising a spin-valve film, i.e., comprises a laminated film 5 utilizing the magnetoresistive effect, and bias layers 6 and electrode layers 7 which are formed on both sides of the laminated film 5.

As shown in FIG. 18, an upper gap layer 8 is formed on the magnetoresistive element 4, and an upper shield layer 9 made of a magnetic material such as permalloy is formed on the upper gap layer 8.

Each of the lower gap layer 3 and the upper gap layer 8 is conventionally made of alumina ($Al_2O_3$). This is because alumina is relatively hard and easy to process, and is thus widely used as an insulating material.

However, the conventional thin film magnetic head using alumina for the gap layers 3 and 8 has caused the following problems along with recent increases in recording density.

(1) The first problem is insulation performance. Although the gap layers 3 and 8 are conventionally formed to a thickness of about 60 nm, the thickness of the gap layers 3 and 8 tends to further decrease due to demand for a narrower gap with increases in recording density. For example, with a recording density of 40 Gbit/in$^2$ or more, it is expected that the gap layers 3 and 8 are formed to a thickness of 30 nm or less.

However, with the gap layers 3 and 8 formed to such a small thickness as described above, an appropriate isolation voltage cannot be obtained by the gap layers 3 and 8 made of aluminum. Therefore, in order to maintain insulation performance, the thickness of the gap layers 3 and 8 cannot be decreased to a level which can comply with narrowing of the gap.

(2) The second problem is developer resistance. FIG. 19 is a partial sectional view of the thin film magnetic head taken along line XIX—XIX in FIG. 18, as viewed from the direction of an arrow.

As shown in FIG. 19, a through hole 7a is formed in the upper gap layer 8 on the electrode layers 7, and a main electrode layer 10 is formed to be electrically connected to the electrode layers 7 through the through hole 7a.

In order to form the main electrode layer 10, the pattern of the main electrode layer 10 is formed on the gap layer 8 by using a resist layer or the like, and the main electrode layer 10 is formed within the pattern.

However, alumina is easily dissolved in a developer such as a strong alkali used for patterning the main electrode layer 10, and thus the etching rate of alumina in exposure to the developer is very high.

Particularly, the thickness of the upper gap layer 8 itself decreases with increases in the recording density in future, thereby causing the serious problem of deterioration in developer resistance.

With low developer resistance, it is difficult to form the upper gap layer to a thickness within a predetermined range, and magnetic insulation between the upper shield layer 11 and the magnetoresistive element 4 cannot be property achieved, thereby deteriorating reliability.

(3) The third problem is a heat radiation property. The density of the current passing through the magnetoresistive element 4 increases with future increases in the recording density, thereby increasing the amount of the heat generated by the magnetoresistive element 4. It is thus expected that the gap layers 3 and 8 have good heat radiation property.

However, the gap layers 3 and 8 made of aluminum are not said to have a sufficient heat radiation property, and the temperature of the magnetoresistive element is increased due to an increase in the current density, resulting in an adverse effect on characteristics.

The above-descried problems (1) to (3) of the gap layers 3 and 8 made of alumina possibly become more serious with further increases in the recording density.

Although alumina has relatively good properties, the gap layers 3 and 8 are further required to have smoothness.

Particularly, the lower gap layer is required to have the smoothness. It is known that when the magneoresistive element 4 is a spin-valve thin film element, the occurrence of unevenness on the surface of the lower gap layer 3 increases the interlayer coupling magnetic field (Hbf) between a free magnetic layer and a pinned magnetic layer which constitute the spin-valve thin film element, thereby decreasing the rate (ΔMR) of change in resistance.

As described above, the gap layers 3 and 8 made of alumina cannot satisfy all the insulation performance, the developer resistance, the smoothness, and the heat radiation property.

SUMMARY OF THE INVENTION

The present invention has been achieved for solving the above problems, and it is an object of the present invention to provide a thin film magnetic head comprising a gap layer made of an Al—Si—O film or Al—Si—O—N film for improving the insulation performance, the developer resistance, the smoothness, and the heat radiation property of the gap layer, and a method of manufacturing the thin film magnetic head.

The present invention provides a thin film magnetic head comprising a lower shield layer, a lower gap layer formed on the lower shield layer, a magnetoresistive element formed on the lower gap layer, an upper gap layer formed on the magnetoresistive element, and an upper shield layer formed on the upper gap layer, wherein the lower gap layer and/or the upper gap layer is made of an insulating material represented by the composition formula Al—Si—O wherein the Si content is 2 at % to 9 at % of the total.

The present invention uses, as a gap layer, a conventional Al—Si—O film composed of the components (Al and O) of alumina and Si added thereto, whereby the insulation performance, the developer resistance, the smoothness, and the heat radiation property of the gap layer can be improved.

The results of experiment described below indicate that the amount of Si added is preferably 2 at % to 9 at % of the total. The addition of Si improves the isolation voltage of the Al—Si—O film, as compared with alumina. For example, $Al_{34.0}Si_{5.0}O_{61.0}$ having a thickness of 30 nm has an isolation voltage of 7.7 MV/cm. The isolation voltage of alumina is 4.0 MV/cm.

The developer resistance is also improved, as compared with alumina. Although the etching rate of alumina is about 50 Å/min, the etching rate of the Al—Si—O film is decreased to a value close to 0 Å/min due to the addition of about 9 at % of Si.

The conceivable cause of improvements in the insulation performance and the developer resistance of the Al—Si—O film as compared with alumina is that $SiO_2$ generally known as an insulating material other than alumina has high insulation performance and high developer resistance, and thus the insulation performance and the developer resistance of the insulating material composed of Al and O and Si added thereto are improved by Si—O bonding.

The smoothness is also good, and the same degree of smoothness as alumina can be maintained.

Furthermore, the heat radiation property is superior to alumina, and thus the element temperature can be sufficiently suppressed even when the current density increases with future increases in the recording density.

The possible cause of improvement in the heat radiation property as compared with allumina is that the atomic arrangement of the Al—Si—O film has short-range order. Although alumina has a completely amorphous structure, the Al—Si—O film exhibits short-range order in the atomic arrangement as the amount of Si added is increased, and thus crystallinity is supposed to be improved. A decision as to whether or not short-range order occurs in the atomic arrangement can be made by observing a transmission electron beam diffraction image.

In the present invention, Si is preferably added to the Al—Si—O film so that when Si is converted into $SiO_2$ in a stoichiometric manner, the $SiO_2$ amount in the film is 10 at % to 38 at %.

In the present invention, Si is more preferably added to the Al—Si—O film so that when Si is converted into $SiO_2$ in a stoichiometric manner, the $SiO_2$ amount in the film is 6.1% by mass to 26.0% by mass.

In the present invention, the insulating material may further contain N and may be represented by the composition formula Al—Si—O—N wherein the N content is 2 at % to 10 at % of the total.

The insulation performance of the Al—Si—O—N film is slightly lower than the Al—Si—O film, but the isolation voltage is higher than that of alumina.

The etching rate of the Al—Si—O—N film is substantially the same as the Al—Si—O film, and the heat radiation property of the former is superior to that of the latter. The experimental results of various properties of the Al—Si—O—N film will be described in detail below.

In the present invention, the Al—Si—O film or Al—Si—O—N film is preferably formed to a thickness of 10 nm to 60 nm. It was confirmed that even when a gap layer is formed to such a small thickness, the insulation performance, the developer resistance, and the smoothness can be sufficiently maintained.

In the present invention, in observation of a transmission electron beam diffraction image, short-range order is preferably observed in the atomic arrangement of the Al—Si—O film or Al—Si—O—N film. The occurrence of short-range order in the atomic arrangement means that crystallinity is improved, and particularly the heat radiation property of the gap layer can be improved.

The present invention also provides a method of manufacturing a thin film magnetic head comprising a lower shield layer, a lower gap layer formed on the lower shield layer, a magnetoresistive element formed on the lower gap layer, an upper gap layer formed on the magnetoresistive element, and an upper shield layer formed on the upper gap layer, the method comprising forming a target composed of AlSi, and introducing $O_2$ gas into a sputtering apparatus to form the lower gap layer and/or the upper gap layer represented by the composition formula Al—Si—O wherein the Si content is 2 at % to 9 at % of the total.

In the present invention, $N_2$ gas may be further introduced into the sputtering apparatus to form the lower gap layer and/or the upper gap layer represented by the composition formula Al—Si—O—N wherein the N content is 2 at % to 10 at % of the total.

In the present invention, the target can be made of AlSi so that the Si amount can be set only by controlling a mixing ratio to Al. Also, the $O_2$ gas and further the $N_2$ gas are introduced into the sputtering apparatus so that the Al—Si—O or Al—Si—O—N film having a predetermined composition can easily be formed by reactive sputtering process.

DESCRIPTION OF THE PREFERRED EMBODIMENTS

Figure 1:
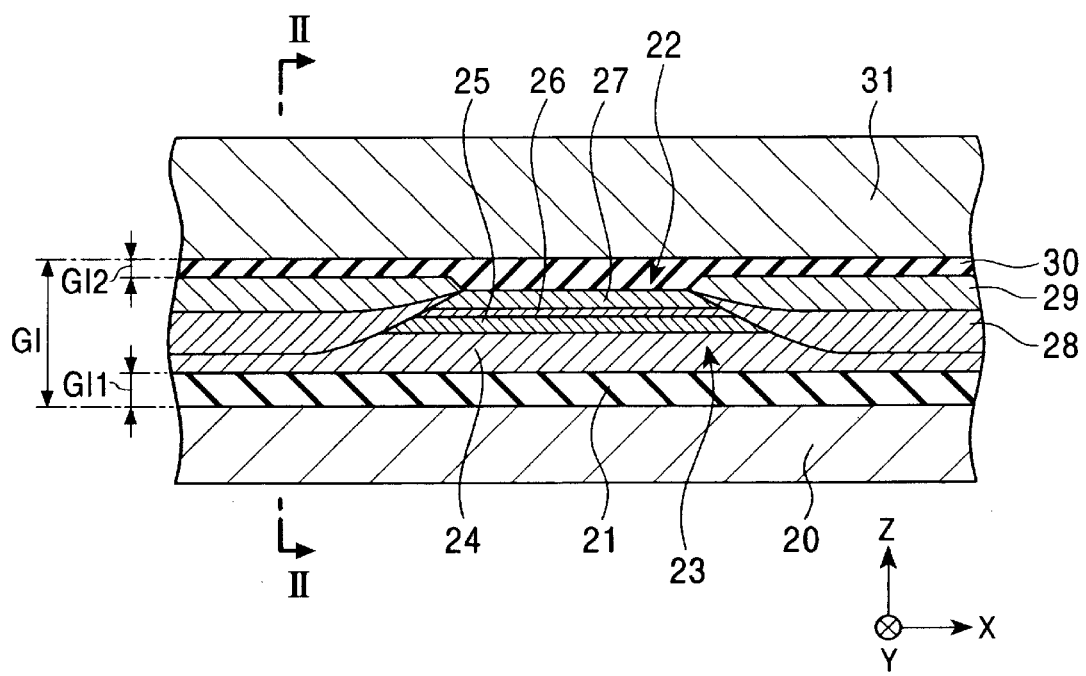
FIG. 1 is a partial sectional view of a thin film magnetic head of the present invention, as viewed from the side facing a recording medium.
Figure 2:
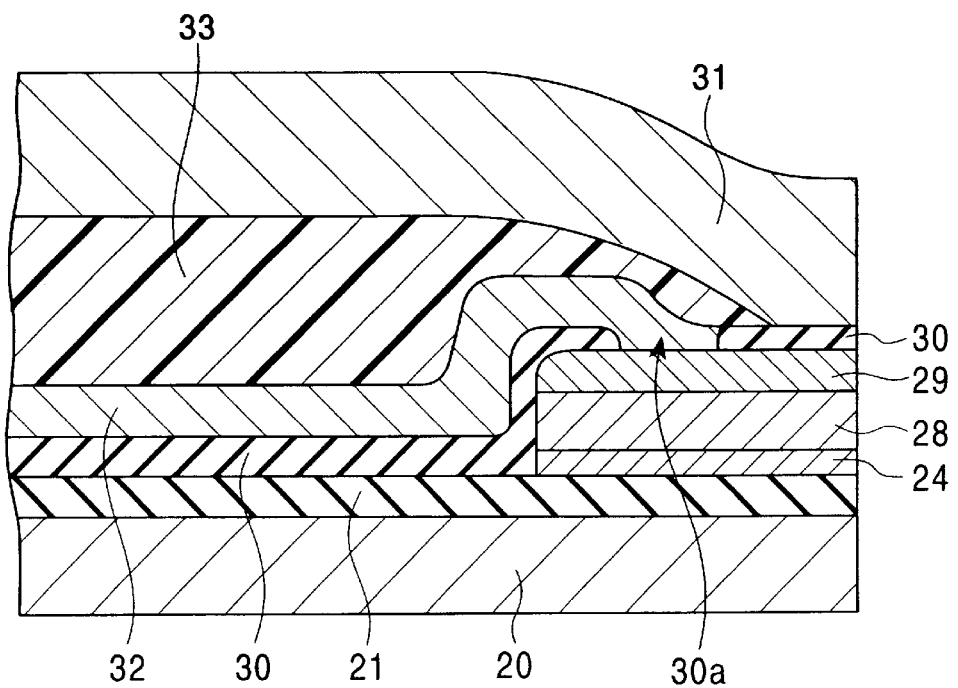
FIG. 2 is a partial sectional view taken along line II—II in FIG. 1, as viewed from the direction of an arrow.

FIG. 1 is a partial sectional view of a thin film magnetic head of the present invention, as viewed from the side facing a recording medium, and FIG. 2 is a partial sectional view taken along line II—II in FIG. 1, as viewed from the direction of an arrow.

A reproducing head (MR head) utilizes the magnetoresistive effect for detecting a leakage magnetic field from a recording medium such as a hard disk, to read a recording signal. A thin film magnetic head of the present invention may be a so-called combination type thin film magnetic head comprising the reproducing head and a recording inductive head laminated thereon. The lower shield layer 20 made of a magnetic material shown in FIG. 1 is formed on the trailing side end surface of a slider.

As shown in FIG. 1, a lower gap layer 21 is provided on the lower shield layer, and a magnetoresistive element 22 is deposited on the lower gap layer 21. The magnetoresistive element 22 comprises a multilayer film 23 formed at the center thereof and exhibiting the magnetoresistive effect, the multilayer film 23 serving as a GMR element utilizing a giant magnetoresistive effect, for example, a spin valve film, or an AMR element utilizing an anisotropic magnetoresitive effect.

The simplest structure of the spin valve film comprises four layers including an antiferromagnetic layer 24, a pinned magnetic layer 25, a nonmagnetic intermediate layer 26, and a free magnetic layer 27. Of these four layers, the antiferromagnetic layer 24 is formed to the largest thickness.

As shown in FIG. 1, hard bias layers 28 and electrode layers 29 (Cu (copper) or W (tungsten)) are formed on both sides of the multilayer film 23. For example, the hard bias layers 28 supply a bias magnetic field to the free magnetic layer 27 of the spin valve film to orient the magnetization direction of the free magnetic layer 27 in the track width direction (the X direction shown in the drawing). On the other hand, magnetization of the pinned magnetic layer 25 of the spin valve film is pinned in the direction vertical to the drawing (height direction; Y direction) by an exchange coupling magnetic field with the antiferromagnetic layer 24. When a magnetic field enters from the recording medium in the direction vertical to the drawing, magnetization of the free magnetic layer 27, which is pinned in the track width direction, is changed to change the electric resistance based on the relation between the variable magnetization of the free magnetic layer 27 and the pinned magnetization of the pinned magnetic layer 24, to detect a recording signal.

As shown in FIG. 1, an upper gap layer 30 is formed on the multilayer film 23 and the electrode layers 29, and an upper shield layer 31 is further formed on the upper gap layer 30. In the combination type thin film magnetic head comprising the reproducing head and the inductive head laminated thereon, the upper shield layer 31 may have the shield function for the reproducing head, and the function as the trailing side core of the inductive head.

As shown in FIG. 1, the gap length G11 is determined by the thickness of the lower gap layer 21, and the gap length G12 is determined by the thickness of the upper gap layer 30. The read gap length G1 is set by the total of the thickness of the multilayer film 23 and the gap lengths G11 and G12.

As shown in FIG. 2, a through hole 30a is formed in the upper gap layer 30 formed on the electrode layers 29. Furthermore, a main electrode layer 32 is formed on the electrode layers 29 through the through hole 30a. The main electrode layer 32 is made of the same material as the electrode layers 29, for example, such as Cu (copper) or W (tungsten) having low electric resistance.

The sensing current flowing through the main electrode layer 32 passes through the electrode layers 29 and the bias layers 28, and mainly flows to the tree layers including the pinned magnetic layer 25, the nonmagnetic intermediate layer 26 and the free magnetic layer 27.

As shown in FIG. 2, an organic insulating layer 33 is formed between the main electrode layer 32 and the upper shield layer 31 to maintain insulation between the main electrode layer 32 and the upper shield layer 31.

In the present invention, the lower gap layer 21 and/or the upper gap layer 30 is made of an insulating material having the composition Al—Si—O. It was confirmed by the experimental results below that the Al—Si—O film has excellent insulation performance, developer resistance, smoothness and heat radiation property.

In the present invention, the Si content is 2 at % to 9 at % of the total. In this range, the good insulation performance, developer resistance and heat radiation property can be obtained, as compared with alumina ($Al_2O_3$) conventionally used for gap layers. Also, the same degree of smoothness as alumina can be obtained.

Particularly, the insulation performance and developer resistance are required to be improved because of the tendency that the thickness of the gap layers 21 and 30 is further decreased with increases in the recording density in future.

In the experimental described above, with the Al—Si—O film having a thickness of 30 nm, the isolation voltage of the Al—Si—O film is 7.7 MV/cm. This isolation voltage is found to be sufficiently higher than the isolation voltage (4.0 MV/cm) of alumina.

With regard to the developer resistance, the etching rate of $Al_2O_3$ is about 50 /min, while a lower etching rate than this etching rate can be obtained by using the Al—Si—O film.

The smoothness significantly influences the interlayer coupling magnetic field (Hbf) between the free magnetic layer 27 and the pinned magnetic layer 25 in the spin valve film. The Al—Si—O film of the present invention can attain the same degree of smoothness as $Al_2O_3$. Particularly, the lower gap layer 21 is required to have smoothness.

With the lower gap layer 21 comprising the Al—Si—O film having good smoothness, i.e., a surface having less unevenness, the pinned magnetic layer 25 and the free magnetic layer 27 formed on the lower gap layer 21 also have less unevenness.

When the pinned magnetic layer 25 and the free magnetic layer 27 are formed with less unevenness, the interlayer coupling magnetic field (Hbf) produced between the pinned magnetic layer 25 and the free magnetic layer 27 is decreased, whereby the rate (ΔMR) of change in resistance of the spin valve thin film element can be sufficiently maintained.

In the present invention, the surface roughness Ra of the Al—Si—O film can be suppressed to about 0.2 (nm) or less, and the interlayer coupling magnetic field can be suppressed to about 790 (A/m).

With respect to the heat radiation property, it was confirmed that with a sensing current 9 mA, the element temperature of the spin valve thin film element comprising the gap layers 21 and 30 of $Al_2O_3$ (30 nm) is 100° C. or more when the DC resistance (DCR) is 60Ω or more. However, it was also confirmed that with a sensing current 9 mA, the element temperature of the spin valve thin film element comprising the Al—Si—O film (30 nm) having a Si content of 2 at % to 9 at % is 100° C. or less even when the DC resistance (DCR) is 80 Ω.

When Si contained in the Al—Si—O film is converted into $SiO_2$ based on stoichiometry with O, the Si content set in the range of 2 at % to 9 at % is converted into the $SiO_2$ amount of 10 at % to 38 at %.

Similarly, when Si contained in the Al—Si—O film is converted into $SiO_2$ based on stoichiometry with O, the $SiO_2$ amount of the film is 6.1% by mass to 26.0% by mass.

The calculation of the $SiO_2$ amount by at % or % by mass is performed on the assumption that Si is stoichiometrically present in a structure represented by the molecular formula $SiO_2$. This does not mean that Si is actually present in the structure represented by $SiO_2$ in which one Si atom is chemically combined with two oxygen atoms in the Al—Si—O film.

In the present invention, each of the gap layers 21 and 30 each comprising the Al—Si—O film preferably has a thickness of 10 nm (100 Å) to 60 nm (600 Å).

The gap layers 21 and 30 are formed to a smaller thickness with increases in the recording density to cause the tendency to decrease the read gap G1 shown in FIG. 1. For example, with a recording density of 40 Gbit/in² or more, the gap layers 21 and 30 are required to have a thickness of 30 nm or less.

In the present invention, even with the Al—Si—O film of 10 nm to 60 nm, the gap layers 21 and 30 having excellent insulation performance, developer resistance and smoothness can be formed. With respect to the head radiation property, the heat radiation property is generally improved as the thickness of the gap layers 21 and 30 decreases, and thus a decease in the thickness causes no defect in the heat radiation property.

In the present invention, N may be added to the Al—Si—O layer so that the gap layers 21 and 30 are made of an insulating material represented by the composition formula Al—Si—O—N.

The amount of N added is preferably 2 at % to 10 at % of the total. The gap layers 21 and 30 each comprising the AlSi—O—N film are preferably formed to a thickness of 10 nm to 60 nm.

Although the insulation performance slightly deteriorates by adding N to the Al—Si—O film as compared with the Al—Si—0 film, a higher isolation voltage than alumina ($Al_2O_3$) can be maintained.

With respect to the developer resistance and smoothness, the same degree as the Al—Si—O film can be maintained satisfactorily.

Furthermore, the heat radiation property of the Al—Si—O—N film can be improved, as compared with the Al—Si—O film.

This is possibly due to the fact that the atomic arrangements of the Al—Si—O and Al—Si—O—N films are different from that of $Al_2O_3$.

Namely, the film structure of the $Al_2O_3$ film is completely amorphous with no order in the atomic arrangement.

On the other hand, in the present invention, in observation of transmission electron beam diffraction images of the Al—Si—O and Al—Si—O—N films, short-range order is observed in the atomic arrangements.

As shown in the experimental results below, the order was clearly observed at a Si content of 5 at % or 7.5 at %, while the order was not observed at a Si content of 10 at %. This is possibly due to the fact that the film structure of the Al—Si—O film becomes again completely amorphous when the Si content is excessively increased.

With the Al—Si—O—N film, the bonding ability of N with Al is possibly enhanced in combination with improvement in the order due to addition of Si to further improve crystallinity.

The short-range order in the atomic arrangement means that crystallinity is improved. Therefore, thermal conductivity is improved by improvement in crystallinity; the heat radiation of the gap layers 21 and 30 can be improved.

As described above, in the present invention, each of the gap layers 21 and 30 comprises the Al—Si—O film containing 2 at % to 9 at % of Si, or the Al—Si—O—N film further containing 2 at % to 10 at % of N, and thus the insulation performance, developer resistance, smoothness and heat radiation property of the gap layers 21 and 30 can be improved, as compared with alumina.

Particularly, the thickness of the gap layers 21 and 30 further increases with increases in the recording density, and the importance of improvements in the above properties is increased due to an increase in the sensing current flowing through the magnetoresistive element 22. Therefore, by using the gap layers 21 and 30 according to the present invention, a thin film magnetic head exhibiting high reliability even with a higher recording density can be manufactured.

The method of manufacturing a thin film magnetic head of the present invention will be described below. In the present invention, the lower gap layer 21 and the upper gap layer 30 are formed by the sputtering process using the target composed of AlSi. Namely, the target used does not contain O (oxygen). However, besides Ar gas, $O_2$ gas is introduced into the sputtering apparatus in order to contain oxygen in the gap layers 21 and 30, thereby depositing the Al—Si—O film by the reactive sputtering process.

In the present invention, in forming the AlSi target, the Si content can be adjusted only by using the ratio to the Al content. Also, the amount of the $O_2$ gas introduced, sputtering electric power, etc. are controlled so that the Al—Si—O film having a Si content of 2 at % to 9 at % of the total can easily be deposited.

In the present invention, besides the $O_2$ gas, $N_2$ gas may be introduced as the introduced gas. The amount of $N_2$ gas introduced is appropriately controlled relative to the $O_2$ gas so that the Al—Si—O—N film having a N content of 2 at % to 10 at % of the total can easily be deposited.

In the present invention, the manufacturing method is not limited to the above, and a sintered target composed of Al—Si—O or Al—Si—O—N with a composition ratio previously controlled in the predetermined range may be formed as the target. In this case, as the introduced gas, only inert Ar gas may be introduced, or $O_2$ gas and $N_2$ gas may be introduced to appropriately adjust the composition ratio of O and N.

Alternatively, a composite target comprising a target composed of $Al_2O_3$ and a target composed of may be used for forming the Al—Si—O film. In order to contain N, $N_2$ gas may be introduced, and a target, for example, composed of AlN may be further used. In use of a plurality of targets, the sputtering electric power applied to each of the targets is controlled to change the amount of sputtering from each of the targets so that the Al—Si—O film having a Si content of 2 at % to 9 at %, and the Al—Si—O—N film having a N content of 2 at % to 10 at % can easily be deposited.

EXAMPLE

In the present invention, experiment on each of the properties such as the insulation performance, developer resistance, smoothness and heat radiation property was carried out by using a gap layer having the composition Al—Si—O or a gap layer having the composition Al—Si—O—N.

First, a gap layer having the composition $Al_{34.0}Si_{5.0}O_{61.0}$ (numerical value: by at %) and a thickness of 30 nm was formed as an example, and an $Al_2O_3$ film and AlN film having a thickness of 30 nm were formed as comparative examples.

Figure 3:
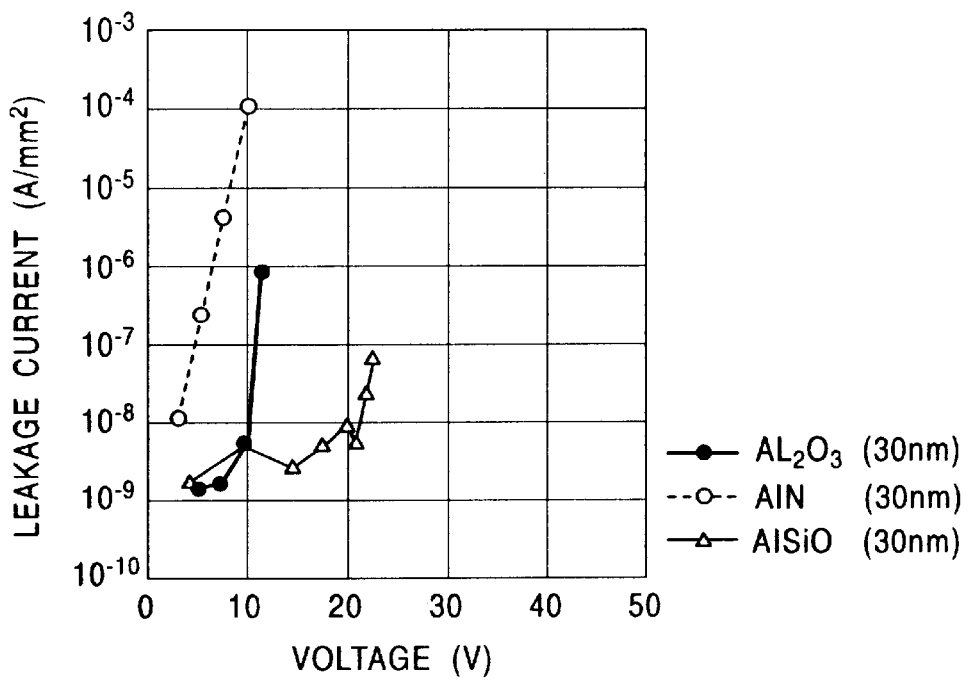
FIG. 3 is a graph showing the relation between the voltage and leakage current of each of a AlSiO film, $Al_2O_3$ film and AlN film used as a gap layer.

Electrode films made of Ni were provided above and below each of the gap layers deposited on a Si substrate with low resistance to apply a voltage to the gap layer while gradually increasing the voltage. At the same time, a leakage current ($A/mm^2$) was measured to calculate the insulation resistance ($\Omega$) from the leakage current. The results of the experiments are shown in FIG. 3.

With the AlN film as the comparative example, the leakage current rapidly increased as the voltage was gradually increased, and the AlN film was broken at the voltage of about 10 V.

With the $Al_2O_3$ film as the comparative example, the leakage current rapidly increased when the voltage exceeded about 10 V, and the film was broken at the voltage of over 12 V.

On the other hand, with the AlSiO film as the example, the leakage current was low at the voltage of over 20 V, and the film was broken at the voltage of about 23 V.

Figure 4:
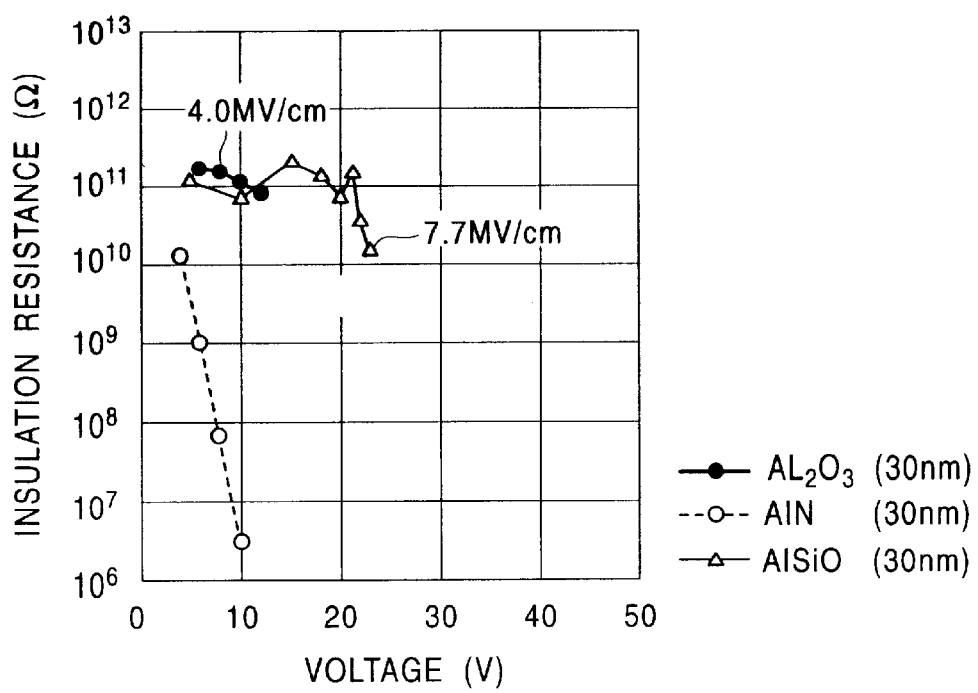
FIG. 4 is a graph showing the relation between the voltage and insulation resistance of each of a AlSiO film, $Al_2O_3$ film and AlN film used as a gap layer.

FIG. 4 is a graph showing the relation between the voltage and insulation resistance ($\Omega$) of the gap layer comprising each of the AlSiO film, the $Al_2O_3$ film and the AlN film. In FIG. 4, the values of insulation resistance ($\Omega$) were calculated from the leakage current values obtained from the experiment results shown in FIG. 3.

As shown in FIG. 4, the $Al_2O_3$ film maintains high insulation resistance up to the voltage of about 12 V, but it is broken at the voltage of over about 12 V. At this time, an isolation voltage of 4.0 MV/cm is confirmed.

On the other hand, the AlSiO film maintains high insulation resistance at the voltage of over 20 V, and it is broken at the voltage of about 23 V. At this time, an isolation voltage of 7.7 MV/cm is confirmed.

Next, a gap layer having the composition $Al_{34.0}Si_{5.0}O_{61.0}$ was formed as an example, and a gap layer comprising $Al_2O_3$ was formed as a comparative example, for examining the relation between the thickness and isolation voltage while changing the thickness of each gap layer. The experimental results are shown in FIG. 5.

Figure 5:
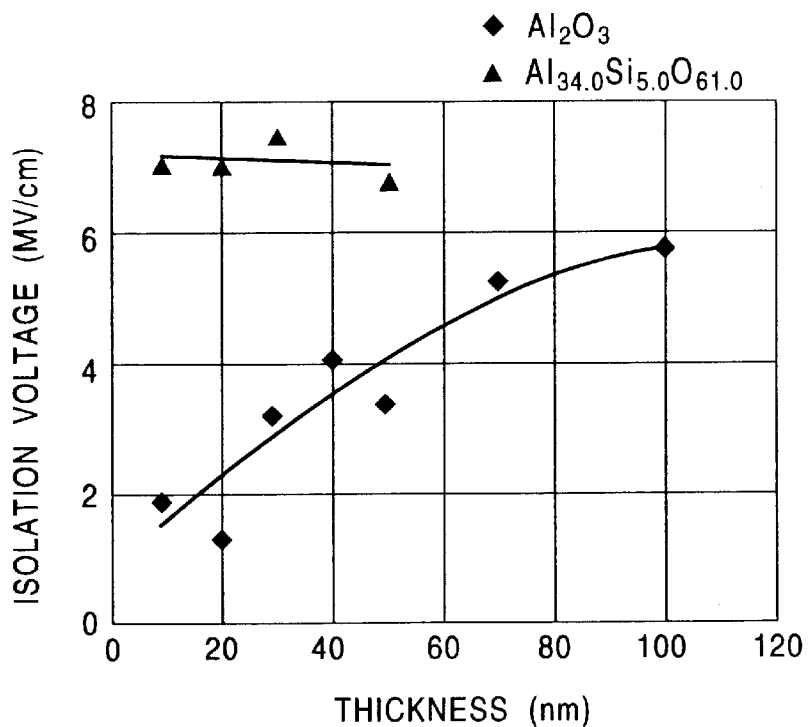
FIG. 5 is a graph showing the relation between the thickness and isolation voltage of each of a AlSiO film and $Al_2O_3$ film used as a gap layer.

As shown in FIG. 5, with the gap layer comprising the $Al_2O_3$ film as the comparative example, the isolation voltage increases as the thickness increases, but the isolation voltage obtained is lower than the isolation voltage of the AlSiO film as the example even when the thickness is about 100 nm.

It is also found that the AlSiO film as the example maintains an isolation voltage of as high as about 7 (MV/cm) even when the thickness is decreased to about 10 nm.

The above experimental results indicate that by using the AlSiO film as the gap layer, a high isolation voltage can be obtained to improve the insulation performance of the gap layer, as compared with generally used alumina.

By using the AlSiO film, a sufficient isolation voltage can be obtained even when the thickness is about 10 nm. Since a current gap layer has a thickness of about 60 nm, the gap layer comprising the AlSiO film of the present invention preferably has a thickness in the range of 10 nm to 60 nm. This permits the formation of a gap layer having high insulation performance even when the gap is narrowed.

Next, experiment was performed on the developer resistance. In this experiment, an $Al_2O_3$ film was formed as a comparative example, and AlSiO films having varying amounts of Si added were formed as examples. The thickness of each of the gap layers was constant at 100 nm. In addition, a strong alkali solution containing KOH as a main component was used as the developer, and the time of exposure to the developer was about 10 minutes. The experimental results are shown in FIG. 6.

Figure 6:
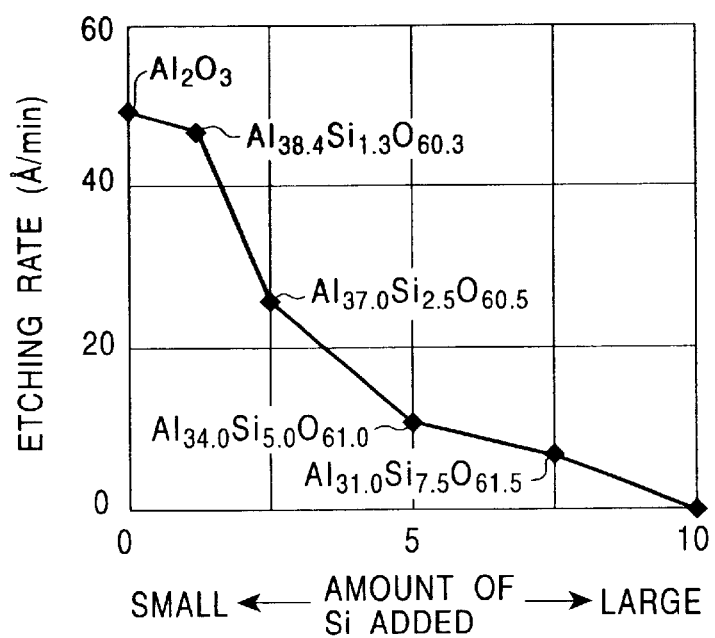
FIG. 6 is a graph showing the relation between the Si content of a AlSiO film and the etching rate.

FIG. 6 indicates that in use of $Al_2O_3$, the etching rate is about 50 Å/min.

It is also found that with the AlSiO containing Si, the etching rate decreases as the amount of Si added increases, and the etching rate is substantially zero (Å/min) when the amount of Si added is 10 at %.

The gap layer having the composition AlSiO exhibits the excellent developer resistance, as compared with the $Al_2O_3$ film.

Next, experiment was performed on the smoothness. In experiment, an $Al_2O_3$ film and an AlN film were formed as comparative examples, and an $Al_{34.0}Si_{5.0}O_{61.0}$ film (numerical values: by at %) was formed as an example.

The thickness of each gap layer was changed to examine the relation between the thickness and surface roughness Ra. The experimental results are shown in FIG. 7.

Figure 7:
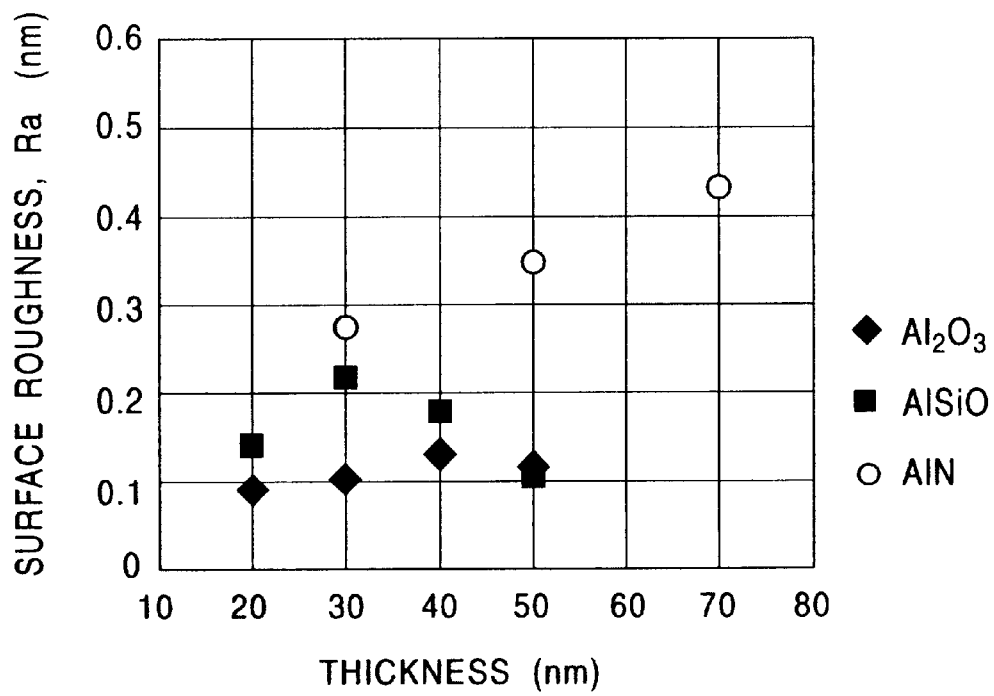
FIG. 7 is a graph showing the relation between the thickness and surface roughness Ra of each of a AlSiO film, $Al_2O_3$ film and an AlN film used as a gap layer.

FIG. 7 indicates that the AlN film has higher surface roughness Ra than the AlSiO film and the $Al_2O_3$ film, and the surface roughness Ra of the AlN film increases as the thickness increases.

On the other hand, both the $Al_2O_3$ film as the comparative example, and AlSiO as the example have low surface roughness. With the thickness in the range of 10 nm to 60 nm, the surface roughness Ra of the AlSiO film can be suppressed to about 0.2 nm or less.

Figure 8:
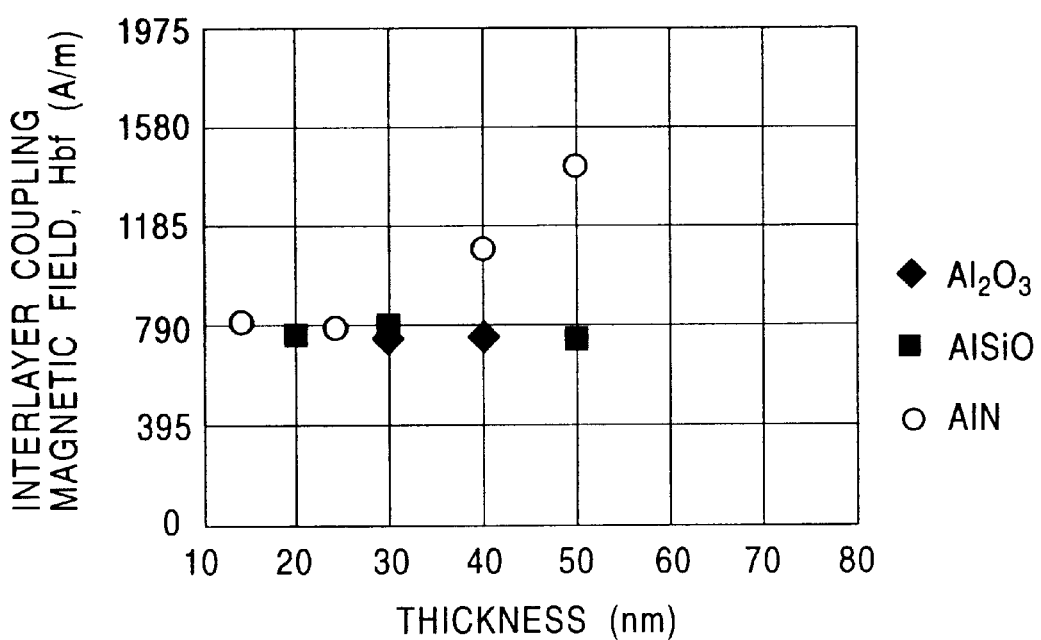
FIG. 8 is a graph showing the relation between the thickness and interlayer coupling magnetic field Hbf of each of a AlSiO film, $Al_2O_3$ film and an AlN film used as a gap layer.

FIG. 8 is a graph showing the relation between the thickness of each gap layer made of the insulating materials used in FIG. 7 and the interlayer coupling magnetic field (Hbf) exerting between a free magnetic layer and a pinned magnetic layer. In experiment, a laminated film comprising an antiferromagnetic layer, a pinned magnetic layer, a nonmagnetic intermediate layer and a free magnetic layer was formed on each of the gaps to measure the interlayer coupling magnetic field.

FIG. 8 indicates that in use of the AlN film as the gap layer, the interlayer coupling magnetic field Hbf increases as the thickness of the AlN increases.

On the other hand, in use of the AlSiO film or the $Al_2O_3$ film as the gap layer, the interlayer coupling magnetic field Hbf is kept down, and is about 790 (Å/m) with a thickness in the range of 10 nm to 60 nm.

As described above, the interlayer coupling magnetic field is preferably as low as possible. The interlayer coupling magnetic field influences the rate of resistance change, and the rate of resistance change can be increased by decreasing the interlayer coupling magnetic field.

Since the AlN film has high surface roughness Ra and poor smoothness, the interlayer coupling magnetic field Hbf is increased to cause an adverse effect on the rate of resistance change.

On the other hand, with the AlSiO film as the example, the surface roughness Ra can be suppressed to the same level as $Al_2O_3$, and the smoothness is excellent. Therefore, the interlayer coupling magnetic field Hbf is decreased, and the sufficient rate of resistance change can be maintained.

Next, experiment was carried out on the radiation property. In experiment, a gap layer comprising a $Al_{34.0}Si_{5.0}O_{61.0}$ film (numerical values: by at %) was prepared as an example, and gap layers respectively comprising an $Al_2O_3$ film and AlN film were prepared as comparative examples. The thickness of each of the gap layers was constant at 30 nm.

Next, a spin valve thin film element was deposited on each of the gap layers, the spin valve thin film element comprising a laminated film comprising an antiferromagnetic layer, a pinned magnetic layer, a nonmagnetic intermediate layer and a free magnetic layer, and bias layers and electrode layers formed on both sides of the laminated film.

In experiment, a constant-current source was connected to the spin valve thin film element to supply a sensing current of 9 mA, and the spin valve thin film element was placed in an oven to increase the element temperature. At this time, the DC current (DCR) of the spin valve thin film element was measured. The experimental results are shown in FIG. 9.

Figure 9:
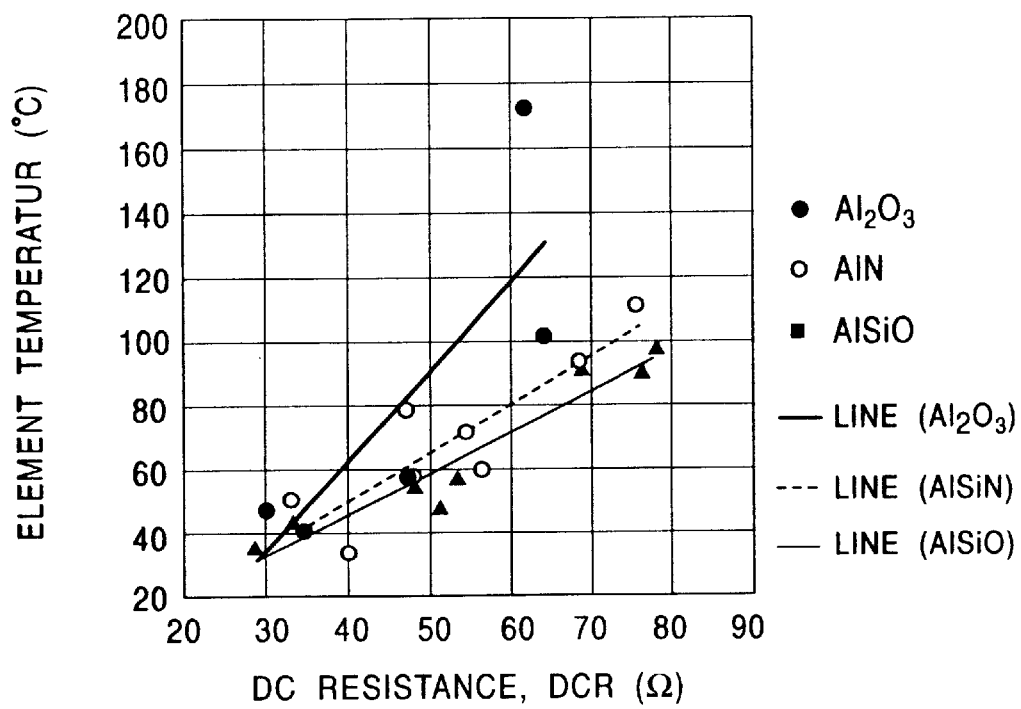
FIG. 9 is a graph showing the relation between the DC resistance (DCR) and element temperature of a spin valve thin film element using each of a AlSiO film, $Al_2O_3$ film and an AlN film as a gap layer.

FIG. 9 indicates that with the gap layer comprising the $Al_2O_3$ film, the element temperature of the spin valve thin film element with a DC resistance is higher than the gap layer comprising the AlSiO film or the AlN film.

Namely, the experimental results reveal that the gap layer comprising the AlSiO film has the sufficient heat radiation property as compared with the $Al_2O_3$ film, and thus an increase in the element temperature of the spin valve thin film element can be appropriately suppressed.

Figure 10:
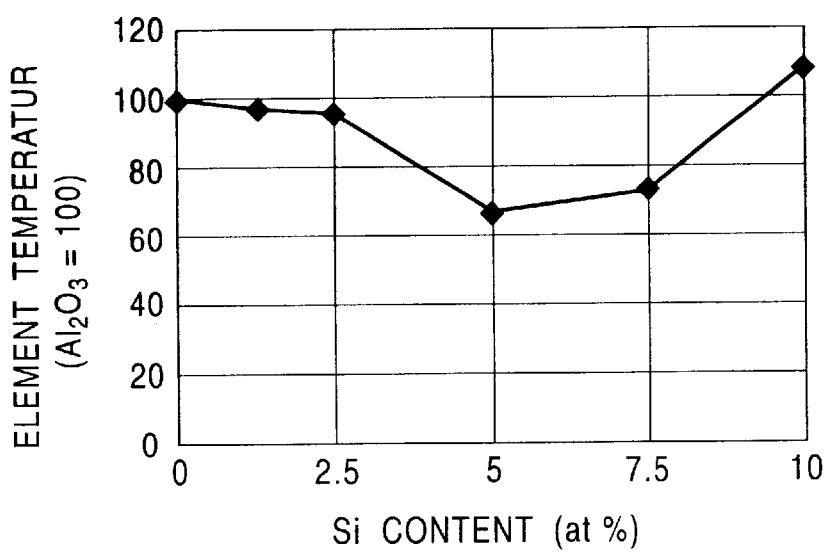
FIG. 10 is a graph showing the relation between the Si content of a AlSiO film and the element temperature.

FIG. 10 is a graph sowing the relation between the Si content of a gap layer comprising an AlSiO film having a thickness of 30 nm and the element temperature. In experiment, a sensing current of 9 mA was supplied to the spin valve thin film element to measure the element temperature when the DC resistance (DCR) of the spin valve thin film element was 50Ω. In FIG. 10, the element temperature shown on the ordinate is represented by a ratio to the element temperature of 100 of the spin valve thin film element in which the gap layer comprised the $Al_2O_3$ film (thickness: 30 nm).

FIG. 10 indicates that the element temperature decreases as the Si content increases. However, at the Si content of 7.5 (at %) or more, the element temperature begins to increase, and at the Si content of about 9 at % or more, the element temperature is higher than that of the spin vale thin film element in which the gap layer comprises $Al_2O_3$.

On the basis of the experimental results, when the gap layer comprises the AlSiO film, the Si content is set in the range of 2 (at %) to 9 (at %).

The experimental results shown in FIG. 10 reveal that the heat radiation property can be improved by appropriately setting the Si content of the AlSiO film, and conversely, with an excessively high Si content, the heat radiation property deteriorates. The cause of this can be explained by a transmission electron beam diffraction image below.

FIGS. 11 to 14 are photographs of transmission electron beam diffraction images of AlSiO films. The AlSiO films shown in FIGS. 11 to 14 had the compositions $Al_{37.0}Si_{2.5}O_{60.5}$, $Al_{34.0}Si_{5.0}O_{61.0}$, $Al_{31.0}Si_{7.5}O_{61.5}$ and $Al_{28.0}Si_{10.0}O_{62.0}$ (all numeral values: by at %), respectively.

Figure 11:
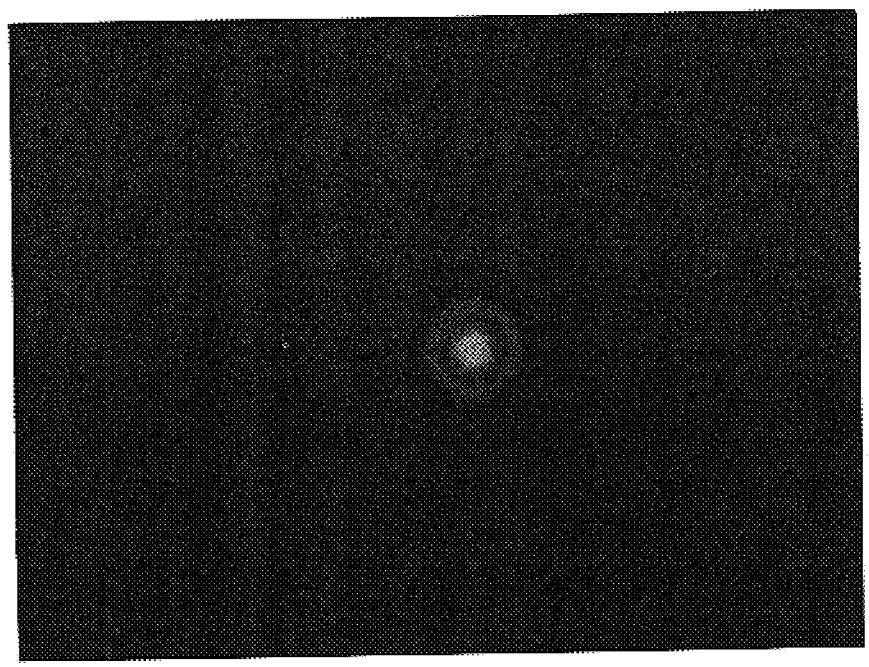
FIG. 11 is a photograph of a transmission electron beam diffraction image of a $Al_{37.0}Si_{2.5}O_{60.5}$ film.
Figure 12:
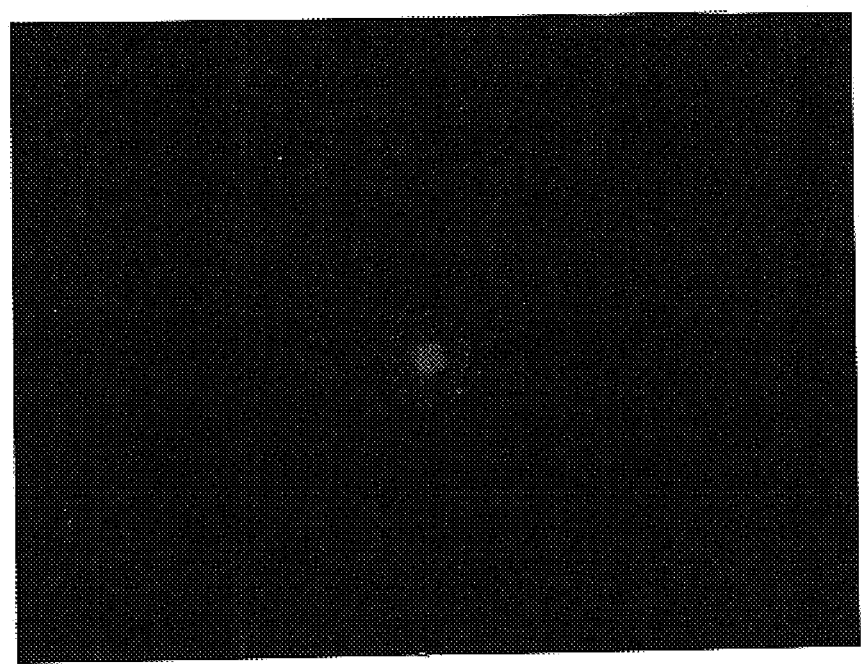
FIG. 12 is a photograph of a transmission electron beam diffraction image of a $Al_{34.0}Si_{5.0}O_{61.0}$ film.
Figure 13:
FIG. 13 is a photograph of a transmission electron beam diffraction image of a $Al_{31.0}Si_{7.5}O_{61.5}$ film.

FIG. 11 shows a fuzzy diffraction image around the beam original point observed at the center thereof. In FIGS. 12 and 13, uncountable fine diffraction mottles appear in a fuzzy image around the beam original point as the Si content increases. It is supposed from these diffraction images that short-range order begins to occur in the atomic arrangement of the AlSiO film to improve crystallinity.

Figure 14:
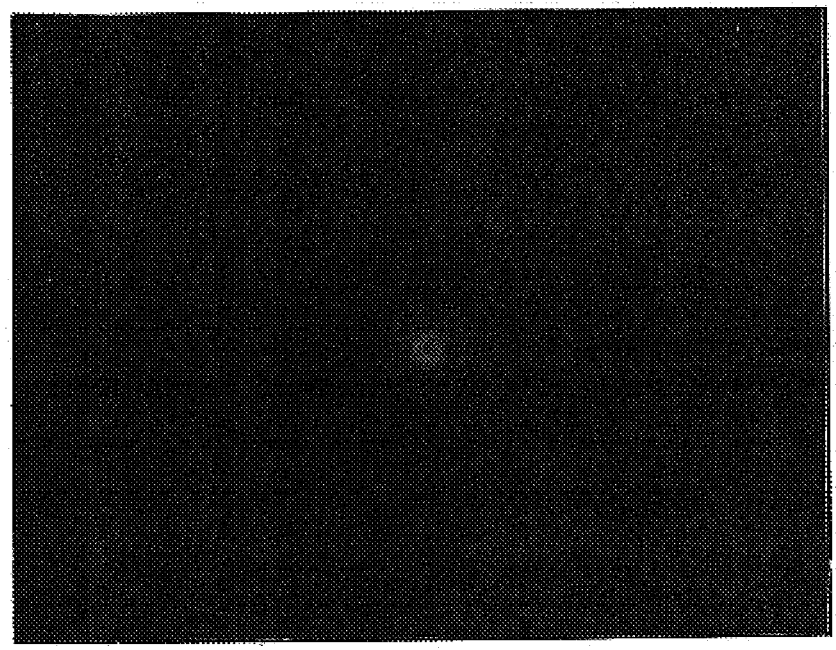
FIG. 14 is a photograph of a transmission electron beam diffraction image of a $Al_{28.0}Si_{10.0}O_{62.0}$ film.

However, as shown in FIG. 14, with the Si content of 10.0 at %, only a fuzzy image is observed around the beam original point, and the short-range order in the atomic arrangement is lost.

The transmission electron beam diffraction images shown in FIGS. 11 to 14 indicate that with the Si content of 2.5 at % or 10 at %, the film structure is completely amorphous, while with the Si content of 5.0 at % or 7.5 at %, besides the amorphous state, short-range order occurs in the atomic arrangement to improve crystallinity.

The relation between the Si content and the element temperature shown in FIG. 10 indicates that with the Si content of 5 at % or 7.5 at %, the heat ration property is good.

Namely, in order to improve the heat radiation property of the AlSiO film, it is possibly preferable that short-range order occurs in the atomic arrangement.

Next, experiment was performed on the insulation performance, developer resistance and heat radiation property of the Al—Si—O—N film by using a gap layer comprising the Al—Si—O—N film.

Figure 15:
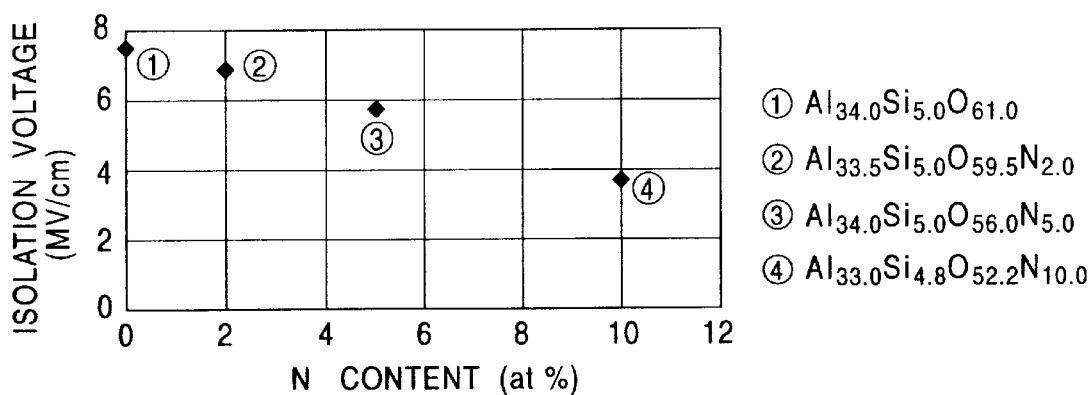
FIG. 15 is a graph showing the relation between the N content of a AlSiON film and the isolation voltage.

FIG. 15 shows the results of measurement of the isolation voltage (MV/cm) of each of the AlSiO film of 30 nm thick shown by ① and the Al—Si—O—N films of 30 nm thick having the compositions respectively shown by ② to ④.

FIG. 15 indicates that the isolation voltage decreases as the N content increases, and with the Ni content of 10 at %, the isolation voltage decreases to the same level (=4 MV/cm) as $Al_2O_3$.

The possible cause of this decrease in the isolation voltage due to an increase in N content is that Al—N bonding occurs in the film. This can be supposed from the fact that the insulation resistance of the AlN film is very low, as described above with referent to FIG. 2.

In the present invention, from the viewpoint of securement of higher insulation than the isolation voltage of the $Al_2O_3$ film, the N content of the Al—Si—O—N film is set in the range of 2 at % to 10 at %.

Figure 16:
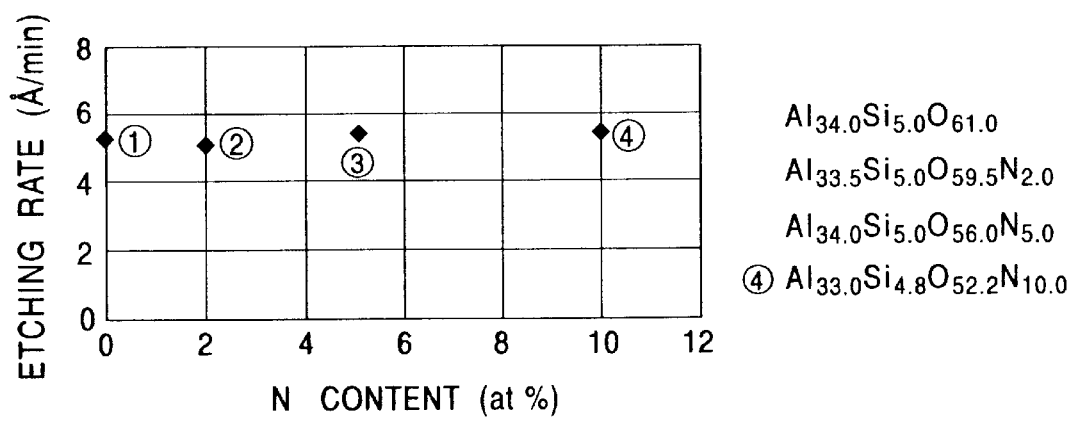
FIG. 16 is a graph showing the relation between the N content of a AlSiON film and the etching rate.

FIG. 16 is a graph showing the results of measurement of the etching rate of each of the AlSiO film of 30 nm thick shown by ① and the Al—Si—O—N films of 30 nm thick having the compositions respectively shown by ② to ④ in etching with a strong alkali solution containing KOH as a main component.

FIG. 16 indicates that the etching rate slightly depends upon the N content, and the etching rate of the Al—Si—O—N film is substantially the same as the AlSiO film. It is thus found that the AlSiON film has the excellent developer resistance.

Next, the AlSiO film of 30 nm thick shown by ① and the Al—Si—O—N films of 30 nm thick having the compositions respectively shown by ② to ④ were formed, and a spin valve thin film element was formed on a gap layer comprising each of these films, and subjected to experiment on the heat radiation property under the same conditions as those shown in FIG. 9. The experimental results are shown in FIG. 17.

Figure 17:
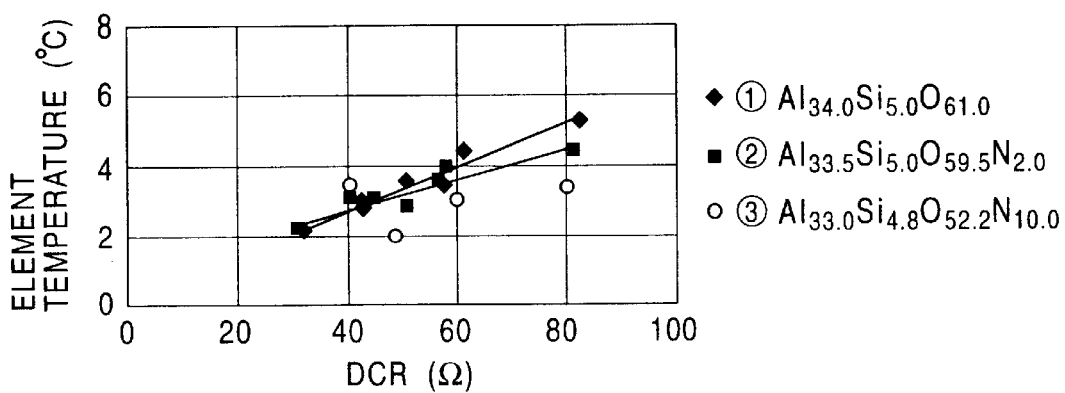
FIG. 17 is a graph showing the DC resistance (DCR) and the element temperature of a spin valve thin film element using a AlSiON film as a gap layer.
Figure 18:
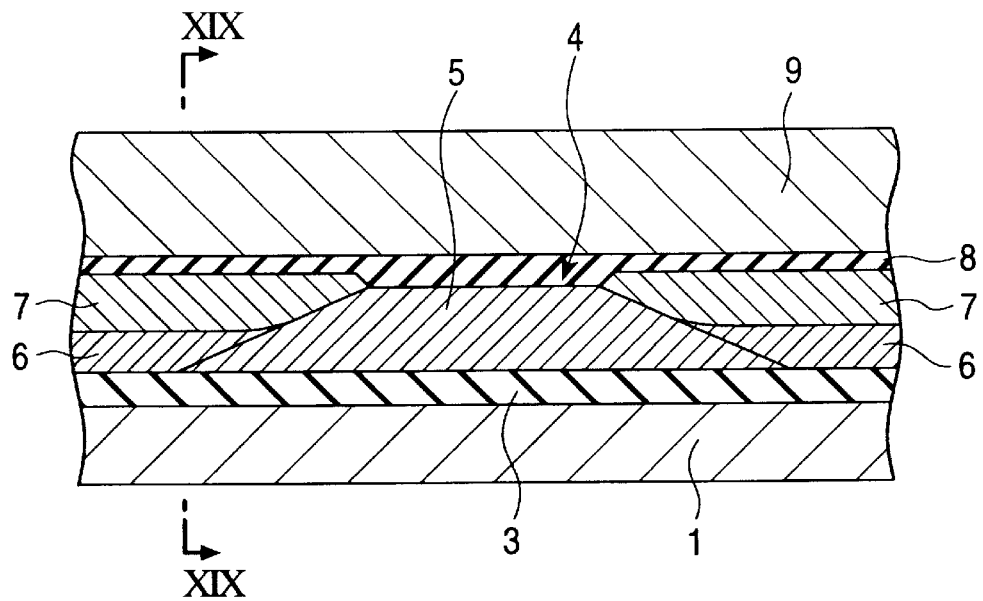
FIG. 18 is a partial sectional view of a conventional thin film magnetic head, as viewed from the side facing a recording medium.
Figure 19:
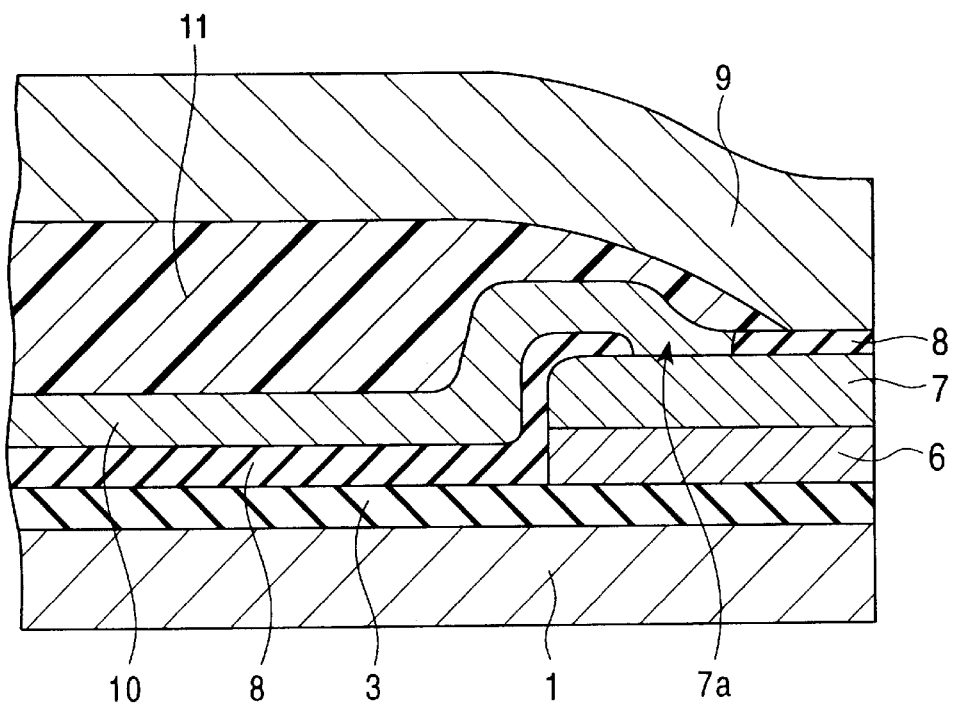
FIG. 19 is a partial sectional view taken along line XIX—XIX in FIG. 18, as viewed from the direction of an arrow.

FIG. 17 indicates that the element temperature of the spin valve thin film element with a DC resistance (DCR) decreases as the N content increases. Namely, the heat radiation property of the AlSiON film is superior to the AlSiO film. This is possibly due to the fact that crystallinity is further improved due to the occurrence of Al—N bonding in the film. The improvement in crystallinity can be supposed to be due to the fact that the AlN film is an insulating material having high crystallinity.

In the present invention, on the basis of the experimental results shown in FIGS. 2 to 16, the Si content of the AlSiO film used as the gap layer is set in the range of 2 at % to 9 at %. When N is further added, the N content of the AlSiON film is preferably set in the range of 2 at % to 10 at %.

The thickness of the AlSiO film or AlSiON film is preferably set in the range of 10 nm to 60 nm.

In addition to the above-described composition ratio, short-range order preferably occurs in the atomic arrangement observed in a transmission electron beam diffraction image.

The AlSiO film or AlSiON film having the above-described composition ratio permits the manufacture of a thin film magnetic head which has excellent insulation performance, developer resistance, smoothness and heat radiation property, and which can appropriately promote gap narrowing to comply with higher recording densities in future.

As described above, in the present invention, a lower gap layer and/or an upper gap layer comprises an AlSiO film having a Si content of 2 at % to 9 at % of the total, or an AlSiON film further having a N content of 2 at % to 10 at % of the total, thereby permitting improvements in insulation performance, developer resistance and heat radiation property of the gap layer while maintaining the same degree of smoothness as $Al_2O_3$.

Furthermore, in the present invention, short-range order is preferably observed in the atomic arrangement of the gap layer in a transmission electron beam diffraction image. As a result, the heat radiation property can be improved, and an increase in the element temperature of a spin valve thin film element can be property suppressed even when a current density supplied to the element is increased due to an increase in the recording density in future.

What is claimed is:

1. A thin film magnetic head comprising a lower shield layer, a lower gap layer formed on the lower shield layer, a magnetoresistive element formed on the lower gap layer, an upper gap layer formed on the magnetoresistive element, and an upper shield layer formed on the upper gap layer;

wherein the lower gap layer and/or the upper gap layer is made of an insulating material represented by the composition formula Al—Si—O wherein the Si content is 2 at % to 9 at % of the total.

2. A thin film magnetic head according to claim 1, wherein when Si contained in the Al—Si—O film is converted into $SiO_2$ in a stoichiometric manner, the $SiO_2$ amount in the film is 10 at % to 38 at %.

3. A thin film magnetic head according to claim 1, wherein when Si contained in the Al—Si—O film is converted into $SiO_2$ in a stoichiometric manner, the $SiO_2$ amount in the film is 6.1 at % to 26.0 at % by mass.

4. A thin film magnetic head according to claim 1, wherein the Al—Si—O film is formed to a thickness of 10 nm to 60 nm.

5. A thin film magnetic head according to claim 1, wherein in observation of a transmission electron beam diffraction image, the short-range order is observed in the atomic arrangement of the Al—S—O film.

* * * * *